United States Patent [19]

Mizuno et al.

[11] Patent Number: 4,647,414

[45] Date of Patent: Mar. 3, 1987

[54] METHOD OF MANUFACTURING CERAMICS

[75] Inventors: Takeyuki Mizuno, Toyohashi; Teruhisa Kurokawa, Aichi, both of Japan

[73] Assignee: NGK Insulators, Ltd., Japan

[21] Appl. No.: 709,800

[22] Filed: Mar. 8, 1985

[30] Foreign Application Priority Data

Mar. 16, 1984 [JP] Japan ................................ 59-52031

[51] Int. Cl.$^4$ ............................................. C04B 33/32
[52] U.S. Cl. .................................... 264/65; 264/62; 264/66
[58] Field of Search ................. 264/62, 66, 570, 65

[56] References Cited

U.S. PATENT DOCUMENTS 4,209,478  6/1980  Wooten et al. ....................... 264/66
4,248,813  2/1981  Hattori et al. ....................... 264/62

FOREIGN PATENT DOCUMENTS 58-104708  6/1983  Japan ................................ 264/570
58-095640  6/1983  Japan ................................ 501/97

Primary Examiner—James Derrington
Attorney, Agent, or Firm—Parkhurst & Oliff

[57] ABSTRACT

Disclosed herein is a method of manufacturing ceramics, which comprises the steps of: applying a film of an elastic material on a ceramic shaped body and hydrostatically pressing the resulting shaped body, heating the pressed body while being buried into an inorganic powder having an average particle size of 10 to 300 μm to remove the elastic film, and firing the resulting body.

20 Claims, 1 Drawing Figure

METHOD OF MANUFACTURING CERAMICS

BACKGROUND OF THE INVENTION

1. Field of the Invention

The present invention relates to a method of manufacturing ceramics. More particularly, the invention relates to a method of removing under heating a film of an elastic material (hereinafter referred to as "elastic film") applied for compression to a shaped body.

2. Description of the Prior Art

Since silicon ceramics such as silicon nitride, silicon carbide, sialon and the like, alumina ceramics, zirconia ceramics and so on are stabler at a high temperature and less susceptible to oxidation corrosion or creep deformation than metals, studies have been actively made for utilizing them as engine parts.

When ceramics for use as engine parts are shaped by mold shaping, injection molding, cast molding and so on, density variation is produced at various portions of the shaped body, so that the characteristics of the resulting sintered bodies are not satisfactory. For this reason, there has been employed a technique that after the whole ceramic shaped body obtained by the above shaping methods is hermetically covered with rubber, compression is isotropically applied to result in the density distribution of the shaped body being uniform.

Although the operation of removing the coated rubber film from the shaped body is ordinarily manually performed, there often occurs in the case of engine parts with a complicated configuration, such as a turbine rotor, that blade can be broken by mistakes during removing the covering rubber film, resulting in the article being defective. Further, since such operation is time consuming, and can not be done by a person other than a skilled person, it is unsuitable for mass production.

In order to resolve such problems, previous attempts involve removal of the covering rubber film through firing in an electric furnace, but it often happens that the rubber penetrates into pores of the ceramic body, which causes the production of cracks.

SUMMARY OF THE INVENTION

It is an object of the present invention to eliminate the drawbacks encountered by the prior art.

More specifically, the object of the present invention is to remove a rubber covering film or the like coated onto a ceramic body without leaving said film on the ceramic body, while preventing the ceramic body from becoming defective due to the fracture or damage of the ceramic body.

According to the present invention, there is a provision of a method of manufacturing ceramics, which comprises the steps of: applying an elastic film onto a ceramic shaped body, hydrostatically pressing the resultant covered body, burying the pressed body in an inorganic powder, and heating the buried body to remove the elastic film, therefrom followed by firing.

According to a preferred aspect of the present invention, there is a provision of a method of manufacturing ceramics, which comprises the steps of: burying a pressed ceramic shaped body in an inorganic powder such as alumina, heating it at a temperature raising rate of 10°–100° C. up to a temperature of not lower than 300° C. to remove an elastic film, and then firing the resultant body.

These and other objects, features and advantages of the invention will be well appreciated upon reading of the following description of the invention when taken in conjunction with the attached drawing with understanding that some modifications, variations and changes of the invention could be easily made by the skilled in the art to which the invetion pertains without departing from the spirit of the invention or the scope of the claims appended hereto.

BRIEF DESCRIPTION OF THE DRAWING

For a better understanding of the invention, reference is made of the attached drawing, wherein.

DETAILED DESCRIPTION OF THE INVENTION

Figure 1:
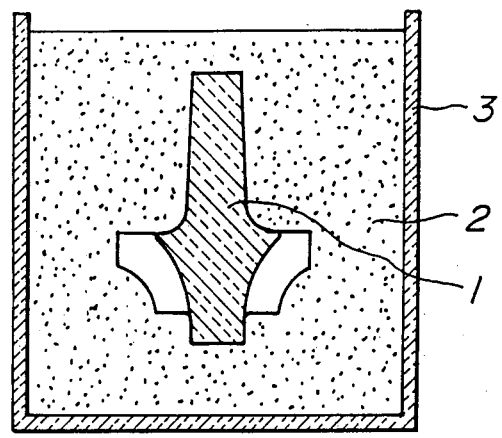
FIG. 1 is a sectional view illustrating an embodiment according to the present invention in the state in which a ceramic turbine rotor coated with a latex rubber has been buried in an alumina powder and is to be heated.

The features of the method of manufacturing ceramics according to the present invention will be described in more detail.

A sintering aid such as $Y_2O_3$, MgO, CaO, $ZrO_2$, $CeO_2$, SrO, BeO, B, C or the like is added into and well mixed with a ceramic powder such as silicon nitride, silicon carbide, sialon, alumina, zirconia or the like to prepare a homegenous mixture. Then, a binder such as resin, wax, plasticizer or the like is added to and kneaded with this mixture, under heating upon necessity, to prepare ceramic raw material. Then, a ceramic shaped body is obtained according to the ordinary ceramic shaping method such as mold shaping, cast molding, injection molding and so on using this ceramic raw material. Thereafter, the binder such as resin, wax, and plasticizer contained in the shaped body thus obtained is removed by heating in an electric furnace. At that time, although the heating conditions depend upon the type and the content of the resin, wax, and plasticizier, the heating is performed in such a manner that the temperature is elevated slowly from room temperature, and at a temperature raising rate of not larger than 100° C./h up to a temperature of 500° C., and preferably at a temperature raising rate of 20° C./h up to a temperature of 300° C.

After calcining is carried out as needed, a slurry-like or solution-form elastic film is formed on the surface of the shaped body by brushing, immersion, spraying or the like. Any elastic material may be used so long as it fits along the configuration of the shaped body and can be isotropically compressed. Latex rubber, resin films and the like are most preferred.

After the surface of the shaped body is well dried, rubber pressing is carried out at a pressure of not lower than 1 ton/cm². After the completion of the rubber pressing operation, the resulting pressed body is buried in an inorganic powder such as alumina in a box. The inorganic powder is preferably a powder which does not react with the ceramic shaped body, and has an average particle size of 10–300 μm. In particular, alumina which meets these requirements is most preferred. The reason why the average particle size is limited is that if it exceeds 300 μm, the inorganic powder can not absorb the softened elastic film, while if it is less than 10 μm, it is extremely difficult for the absorbed elastic film to be decomposed and evaporated.

The resulting ceramic body is then heated in an electric furnace to remove the elastic film on the surface thereof under heating. Although the heating conditions depend upon the type and the thickness of the coated elastic material, the temperature is raised ordinarily at a temperature raising rate of 10°–100° C./h, and preferably at 40°–60° C./h, and the resulting body is maintained at a temperature of not lower than 300° C., and preferably from 400° to 500° C. for not less than 1 hour. The reason why the temperature raising rate is restricted is that while if it exceeds 100° C./h, cracks are likely to be produced in the shaped body due to a rapid heating, while if it is less than 10° C./h, the heating time period becomes larger so that there is a likelihood that the elastic material coated on the surface of the shaped body impregnates into the inside of the shaped body. Further, if the heating temperature is less than 300° C., the elastic material coated onto the surface of the shaped body can not be completely removed.

After the resulting shaped body from which the elastic film has been removed is machined, as needed, it is fired at an intended temperature and atmosphere to obtain a ceramic article.

In the following, the present invention will be explained more in detail with reference to the following example, which is merely illustrative of the invention, but should not be interpreted as limiting the scope thereof.

EXAMPLE 1

Two parts by weight (hereinafter referred to as "part") of SrO, three parts of MgO, and three parts of $CeO_2$ as a sintering aid were added to 100 parts of $Si_3N_4$ having an average particle size of 1 μm to prepare a $Si_3N_4$ mixture to be sintered at atmospheric pressure. Five % by weight (hereinafter referred to as "%") of EVA resin and fifteen % of polyethylene wax were added to and kneaded with a part of this mixture under heating condition to prepare ceramic raw material to be shaped through injection molding. Thereafter, the above ceramic raw material was subjected to injection molding using a mold so designed as to yield a radial type turbine rotor which may have the blade maximum diameter of 50 mm after firing, thereby obtaining two shaped bodies 1 in which blade portions and a shaft portion were integrated. Next, heating was carried out at a temperature raising rate of 15° C./h from 40° C. to 400° C. in a hot blast circulation type electric furnace, and dewaxing was carried out while the temperature was maintained at 400° C. for 5 hours. Upon observation of this dewaxed shaped body, no dewaxing crack was observed. The dewaxed shaped body was heated at a tempeature raising rate of 100° C./h up to 1,100° C. in a nitrogen atmosphere, and calcination was carried out while the temperature was maintained at this temperature for 30 minutes. Subsequently, a slurry-like latex rubber was applied onto the surface of the thus obtained shaped body in a thickness of about 80 μm, and rubber pressing was performed at a pressure of 2 ton/cm². Thereafter, for the purpose of comparing the manufacturing method according to the present invention and the conventional manufacturing method, the shaped bodies A and B were obtained according to the present invention and the conventional method, respectively. As shown in FIG. 1, the shaped body A was buried inside of a box 3 made of porcelain into which alumina powder 2 having an average particle size of 20 μm was filled, while the blade portions were buried downwardly. To the contrary, the shaped body B was coated with a rubber film without being buried in the powder. After the shaped body A buried into the box and the shaped body B as only coated with the rubber film were set into an electric furnace, they were heated at 100° C./h up to a temperature of 450° C. and held at this temperature for 5 hours to remove the latex rubber. Upon observation of the shaped bodies A and B after removal of the latex rubber, it was revealed, as shown in Table 1, that no latex rubber remained on the shaped body A having no cracks, while a trace of carburized latex rubber remained on the surface of the shaped body B, and the body B had cracks.

TABLE 1

| | Latex-removing conditions | Appearance of shaped body |
|---|---|---|
| Shaped body A of the present invention | buried into alumina powder (see FIG. 1) | latex rubber: not remained crack: no |
| Shaped body B of the prior art | not buried into alumina powder, and merely coated with rubber film | latex rubber: trace of carburization cracks produced on the surface |

Heating conditions: Temperature rise rate 100° C./h Heating temperature 450° C. × 5 hours Then, after the shaped body A according to the method of the present invention was subjected to firing in a nitrogen atmosphere at 1,720° C. for 30 minutes, it was finely finished by means of a lathe to obtain a radial type ceramic turbine rotor.

As mentioned in the foregoing, the ceramic-producing method according to the present invention is industrially more advantageous as compared with the conventional ceramic-producing method, since the elastic film applied on to the ceramic shaped body is removed under heating while being buried into the inorganic powder to diminish the troubles caused by the fracture of the ceramic body at the time of removing the elastic film attached to the ceramic shaped body without being left thereon.

What is claimed is:
1. A method of manufacturing ceramics comprising:
  shaping a ceramic body from a ceramic material;
  applying a film comprising an elastic material upon the shaped ceramic body to form a coated body;
  hydrostatically pressing the coated body;
  burying the hydrostatically pressed body in an inorganic powder which does not react with the buried hydrostatically pressed body when heated, said inorganic powder having an average particles size of 10 to 300 μm;
  heating the buried body to remove the elastic film; and
  firing the body having said elastic film removed therefrom.
2. A method of manufacturing ceramics according to claim 1, wherein the elastic material comprises latex rubber.
3. A method of manufacturing ceramics according to claim 1, wherein the elastic material comprises a resin film.
4. A method of manufacturing ceramics according to claim 1, wherein the inorganic powder comprises alumina.
5. A method of manufacturing ceramics according to claim 1, wherein a temperature raising rate during heating is in a range of 10°–100° C./h.
6. A method of manufacturing ceramics according to claim 1, wherein the buried body is heated to a temperature in a range of not lower than 300° C.

7. A method of manufacturing ceramics according to claim 1, wherein the pressed body comprises a pressed body for a turbocharger rotor.

8. A method of manufacturing ceramics according to claim 1, wherein a temperature raising rate during heating is in a range of 40°–60° C./h.

9. A method of manufacturing ceramics according to claim 1, wherein the buried body is heated to a temperature in a range of not lower than 400°–500° C.

10. A method of manufacturing ceramics according to claim 9, wherein the buried body is heated for not less than one hour.

11. A method of manufacturing ceramics according to claim 1, wherein the temperature raising rate during heating is 40°–60° C./h and the buried body is heated to a temperature of not less than 300° C. for not less than one hour.

12. A method of manufacturing ceramics comprising:
shaping a ceramic body from a ceramic material selected from the group consisting of silicon nitride, silicon carbide, sialon, alumina and zirconia, said ceramic material being mixed with a sintering aid and a binder;
applying a film comprising an elastic material upon the shaped ceramic body by brushing, immersion or spraying to form a coated body, said elastic material being selected from the group consisting of latex rubber and resin films;
hydrostatically pressing the coated body;
burying the hydrostatically pressed body in an alumina powder which does not react with the buried hydrostatically pressed body when heated, said alumina powder having an average particle size of 10 to 300 $\mu$m;
heating the buried body to remove the elastic film; and
firing the body having said elastic film removed therefrom.

13. A method of manufacturing ceramics according to claim 12, wherein said sintering aid is selected from the group consisting of $Y_2O_3$, MgO, CaO, $ZrO_2$, $CeO_2$, SrO, BeO, B and C.

14. A method of manufacturing ceramics according to claim 12, wherein said binder comprises a material selected from the group consisting of resin, wax and plasticizer.

15. A method of manufacturing ceramics according to claim 12, wherein the hydrostatic pressing occurs at a pressure of not lower than 1 ton/cm$^2$.

16. A method of producing ceramics according to claim 12, wherein the firing occurs in a nitrogen atmosphere.

17. A method of manufacturing ceramics according to claim 12, wherein a temperature raising rate during heating is in a range of 10°–100° C./h.

18. A method of manufacturing ceramics according to claim 12, wherein the buried body is heated to a temperature in a range of not lower than 300° C.

19. A method of manufacturing ceramics according to claim 12, wherein the buried body is heated to a temperature in a range of not lower than 400°–500° C.

20. A method of manufacturing ceramics according to claim 12, wherein the temperature raising rate during heating is 40°–60° C./h and the buried body is heated to a temperature of 400°–500° C. for not less than one hour.

* * * * *